(12) United States Patent
Yasusaka

(10) Patent No.: US 11,119,519 B2
(45) Date of Patent: Sep. 14, 2021

(54) LINEAR POWER SUPPLY

(71) Applicant: Rohm Co., Ltd., Kyoto (JP)

(72) Inventor: Makoto Yasusaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/990,394

(22) Filed: Aug. 11, 2020

(65) Prior Publication Data

US 2021/0055753 A1 Feb. 25, 2021

(30) Foreign Application Priority Data

Aug. 20, 2019 (JP) .............................. JP2019-150587

(51) Int. Cl.
  *G05F 1/46* (2006.01)
  *B60R 16/033* (2006.01)
  *G05F 1/575* (2006.01)

(52) U.S. Cl.
  CPC ............ *G05F 1/468* (2013.01); *B60R 16/033* (2013.01); *G05F 1/575* (2013.01)

(58) Field of Classification Search
  None
  See application file for complete search history.

(56) References Cited

U.S. PATENT DOCUMENTS

| 5,319,302 | A  * | 6/1994  | Koshikawa | G05F 1/465 323/273 |
| 6,218,819 | B1 * | 4/2001  | Tiwari    | G05F 1/565 323/274 |
| 6,271,652 | B1 * | 8/2001  | Burstein  | G05F 3/30 323/313 |
| 6,509,783 | B2 * | 1/2003  | Chowdhury | G05F 3/30 327/512 |
| 6,515,461 | B2 * | 2/2003  | Akiyama   | G05F 1/465 323/313 |
| 6,683,445 | B2 * | 1/2004  | Park      | G05F 1/465 323/313 |
| 6,803,809 | B2 * | 10/2004 | Saitoh    | G05F 1/56 323/313 |
| 7,057,447 | B1 * | 6/2006  | Tiwari    | G05F 1/565 327/541 |

(Continued)

FOREIGN PATENT DOCUMENTS

| JP | 2013-162145 | 8/2013 |
| JP | 2016-200989 | 12/2016 |
| JP | 2018-112963 | 7/2018 |

*Primary Examiner* — Thomas J. Hiltunen
(74) *Attorney, Agent, or Firm* — Fish & Richardson P.C.

(57) ABSTRACT

For example, a linear power supply includes an output transistor connected between an input terminal of an input voltage and an output terminal of an output voltage, an internal power supply configured to step down the input voltage to generate a predetermined internal power supply voltage, a reference voltage generator configured to generate a predetermined reference voltage from the internal power supply voltage, an amplifier configured to generate a drive signal for the output transistor such that a feedback voltage in accordance with the output voltage is equal to the reference voltage, a drive current generator configured to generate a drive current for the amplifier, and a drive current controller configured to detect a variation of the internal power supply voltage to variably control the drive current.

8 Claims, 13 Drawing Sheets

(56) References Cited

U.S. PATENT DOCUMENTS

| | | | |
|---|---|---|---|
| 8,026,708 B2 * | 9/2011 | Imura | G05F 1/575 |
| | | | 323/285 |
| 9,904,305 B2 * | 2/2018 | Brown | G05F 1/575 |
| 10,627,844 B1 * | 4/2020 | Ji | G05F 1/468 |
| 2016/0299518 A1 | 10/2016 | Iwata et al. | |

* cited by examiner

LINEAR POWER SUPPLY

CROSS-REFERENCE TO RELATED APPLICATIONS

This application is based on Japanese Patent Application No. 2019-150587 filed on Aug. 20, 2019, the contents of which are hereby incorporated by reference.

BACKGROUND OF THE INVENTION

1. Field of the Invention

The invention disclosed herein relates to a linear power supply.

2. Description of Related Art

Linear power supplies (series regulators such as low drop out (LDO) regulators) have conventionally been used as power supply means for various devices.

Here, in a linear power supply which receives supply of an input voltage (such as a battery voltage) with low stability, it is necessary to enhance its response characteristic (=its input transient response characteristic) with respect to a transient variation of the input voltage. This is because, with a low input transient response characteristic, a variation of the input voltage causes a variation of an output voltage as well, and this can degrade the characteristic of a load or damage the load. In particular, in recent years, with the trend toward lower input voltages supplied to linear power supplies, there have been increasingly demanding requirements for the input transient response characteristic.

The applicant of the present application proposed a linear power supply with a high input transient response characteristic (Japanese Patent Application Publications No. 2018-112963 and No. 2016-200989) and an amplifier capable of achieving both power saving and a higher speed (Japanese Patent Application Publication No. 2013-162145), but further consideration has been needed for how to improve the input transient response characteristic of a linear power supply (how to control a drive current for an amplifier).

SUMMARY OF THE INVENTION

In view of the above problem found by the inventor of the present invention, an object of the invention disclosed herein is, for example, to provide a linear power supply with a superior input transient response characteristic.

For example, a linear power supply disclosed herein includes an output transistor connected between an input terminal of an input voltage and an output terminal of an output voltage, an internal power supply configured to step-down the input voltage to generate a predetermined internal power supply voltage, a reference voltage generator configured to generate a predetermined reference voltage from the internal power supply voltage, an amplifier configured to generate a drive signal for the output transistor such that a feedback voltage in accordance with the output voltage is equal to the reference voltage, a drive current generator configured to generate a drive current for the amplifier, and a drive current controller configured to detect a variation of the internal power supply voltage to variably control the drive current.

Other features, components, steps, advantages, and characteristics of the present invention will be disclosed in the following detailed description of the best mode for carrying out the present invention and relevant attached drawings.

DETAILED DESCRIPTION OF PREFERRED EMBODIMENTS

First, before describing new embodiments regarding a linear power supply, a brief description will be given of a comparative example to be compared with the new embodiments.

COMPARATIVE EXAMPLE

Figure 1:
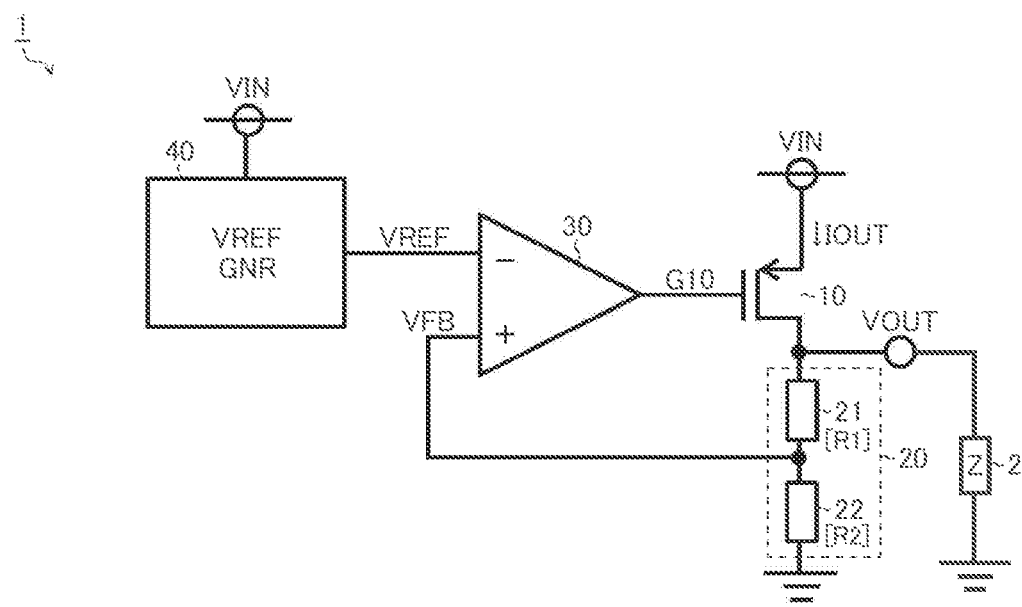
FIG. 1 is a diagram showing a comparative example of a linear power supply.

FIG. 1 is a diagram showing a comparative example of a linear power supply. A linear power supply 1 of the comparative example has an output transistor 10, a voltage divider 20, an amplifier 30, and a reference voltage generator 40, and steps down an input voltage VIN to generate a desired output voltage VOUT. The input voltage VIN is supplied from an unillustrated battery or the like, and its stability is not necessarily high. The output voltage VOUT is supplied to a load 2 (such as a secondary power supply, a microcomputer, or the like) of a subsequent stage. The linear power supply 1 is usable as a reference voltage supply incorporated in an IC, for example.

The output transistor 10 is connected between an input terminal of the input voltage VIN and an output terminal of the output voltage VOUT, and its conductivity (in other words, its on resistance value) is controlled in accordance with a gate signal G10 from the amplifier 30. Here, the example shown in the figure uses, as the output transistor 10, a P-channel type MOSFET (PMOSFET). Accordingly, as the gate signal G10 is lower, the conductivity of the output transistor 10 increases, and the output voltage VOUT increases. Conversely, as the gate signal G10 is higher, the conductivity of the output transistor 10 decreases, and the output voltage VOUT decreases. However, as the output transistor 10, instead of a PMOSFET, an NMOSFET may be used, or a bipolar transistor may be used.

The voltage divider 20 includes resistors 21 and 22 (respectively having resistance values R1 and R2) connected in series between the output terminal of the output voltage VOUT and a ground terminal, and the voltage divider 20 outputs, from a connection node between the two resistors, a feedback voltage VFB (=VOUT×[R2/(R1+R2)]) in accordance with the output voltage VOUT. However, if the output voltage VOUT is within an input dynamic range of the amplifier 30, the voltage divider 20 may be omitted and the output voltage VOUT as it is may be directly fed to the amplifier 30 as the feedback voltage VFB.

The amplifier 30 generates the gate signal G10 (which corresponds to a drive signal for the output transistor 10) such that the feedback voltage VFB fed to its non-inverting input terminal (+) is equal to a predetermined reference voltage VREF fed to its inverting input terminal (−), and drives the output transistor 10. To be more specific, the amplifier 30 raises the gate signal G10 as a difference value ΔV (=VFB−VREF) between the feedback voltage VFB and the reference voltage VREF is higher, and conversely, the amplifier 30 lowers the gate signal G10 as the difference value ΔV is lower.

The reference voltage generator 40 generates the reference voltage VREF (a fixed value) from the input voltage VIN. Here, as the reference voltage generator 40, for example, a bandgap voltage supply with a low power-supply dependence and a low temperature dependence can be preferably used.

Input Transient Response Characteristic (Comparative Example)

Figure 2:
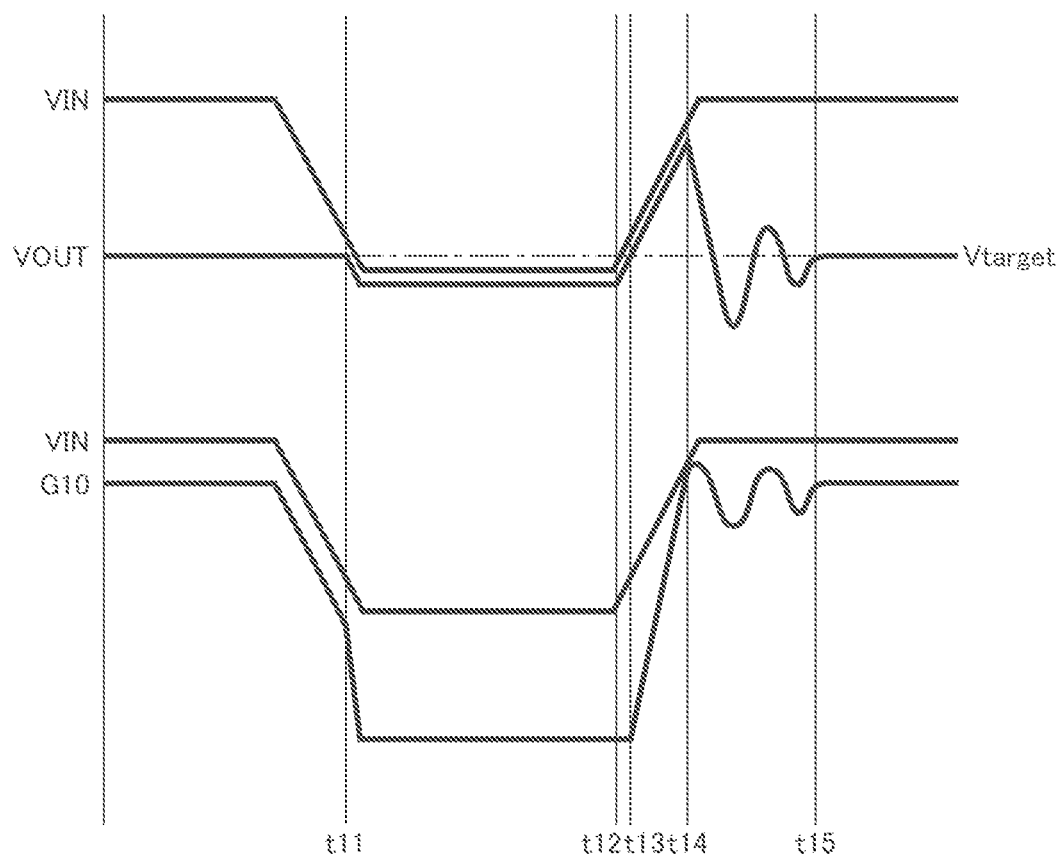
FIG. 2 is a diagram showing an input transient response characteristic in the comparative example.

FIG. 2 is a diagram showing an input transient response characteristic in the comparative example. Here, an upper part of the figure shows a relationship between the input voltage VIN and the output voltage VOUT, and a lower part of the figure shows a relationship between the input voltage VIN and the gate signal G10.

Along with decrease of the input voltage VIN, if the input voltage VIN decreases to be below an output target value Vtarget (=a target value of the output voltage VOUT), a state is brought about where the feedback voltage VFB is constantly below the reference voltage VREF. As a result, the amplifier 30 is brought into a state where the gate signal G10 is lowered to its lowest possible level, and thus the output transistor 10 falls into a full-on state (see time t11 to time t13). That is, the amplifier 30 operates in a manner close to a comparator.

In a case where the input voltage VIN sharply increases from such a state to be higher than the output target value Vtarget, the amplifier 30 tries to turn off the output transistor 10 by raising the gate signal GO. However, it is difficult to raise the gate signal G10 completely at low level instantaneously following the sharp variation of the input voltage VIN. As a result, with the output transistor 10 left in the full-on state, the input voltage VIN is outputted as it is, and this causes an overshoot of the output voltage VOUT (see time t13 to time t15). The occurrence of such an overshoot may lead to malfunction or destruction of the load 2.

A speed of turning off the output transistor 10 depends on a response speed of the amplifier 30, a current capacity of the amplifier 30 in the output stage, an impedance that an internal terminal of the amplifier 30 has, a gate capacitance of the output transistor 10, etc. A time that such an overshoot takes to disappear depends on characteristics (a phase margin, a response speed) of the amplifier 30, etc.

To improve the input transient response characteristic of the linear power supply 1, it is necessary to increase a drive current for the amplifier 30 to obtain a higher gain, or to reduce an internal capacitance value of the amplifier 30. However, the gain and the internal capacitance value of the amplifier 30 are determined taking original characteristics and stability of the linear power supply 1 into consideration. Accordingly, it is difficult to change the gain or the internal capacitance value of the amplifier 30 just to improve the input transient response characteristic of the linear power supply 1. Further, increasing the drive current for the amplifier 30 in a fixed manner leads to increased current consumption in the amplifier 30 (thus in the linear power supply 1), and this is against the reduction of current consumption, which has been required in recent years.

In the following description, a first embodiment will be proposed where such inconvenience can be eliminated.

First Embodiment

Figure 3:
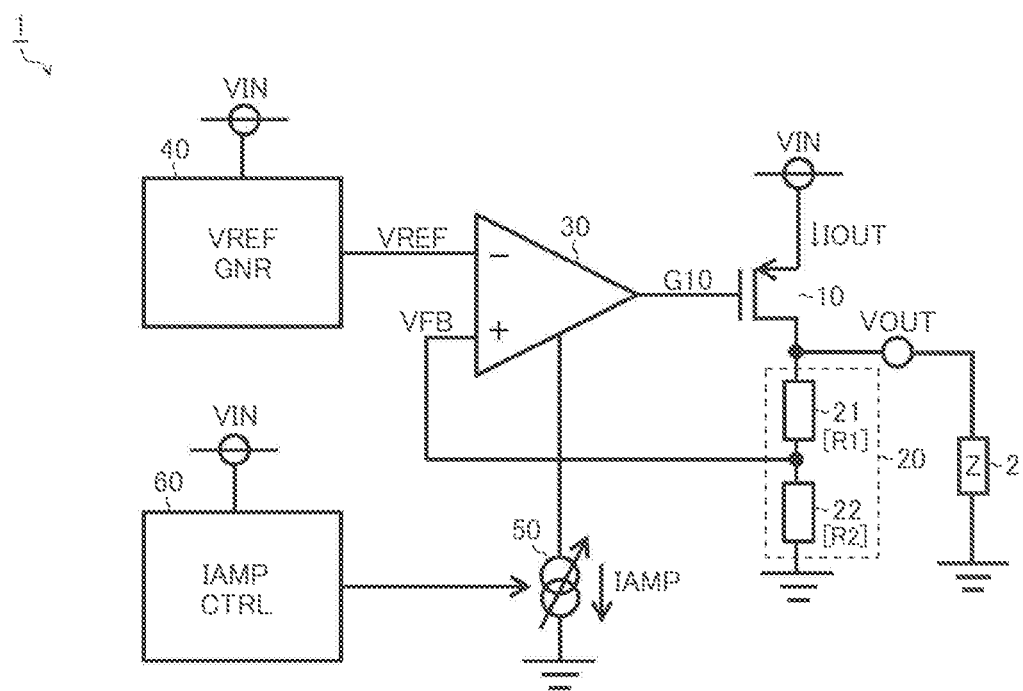
FIG. 3 is a diagram showing a first embodiment of the linear power supply.

FIG. 3 is a diagram showing a first embodiment of a linear power supply. A linear power supply 1 of the present embodiment is based on the above-described comparative example (FIG. 1), and further includes, in addition to the above-described components 10 to 40, a drive current generator 50 and a drive current controller 6).

The drive current generator 50 is a sink current supply connected between the amplifier 30 and the ground terminal, and generates a drive current IAMP for the amplifier 30.

The drive current controller 60 detects a variation (an increase) of the input voltage VIN and variably controls the drive current IAMP.

Input Transient Response Characteristic (First Embodiment)

Figure 4:
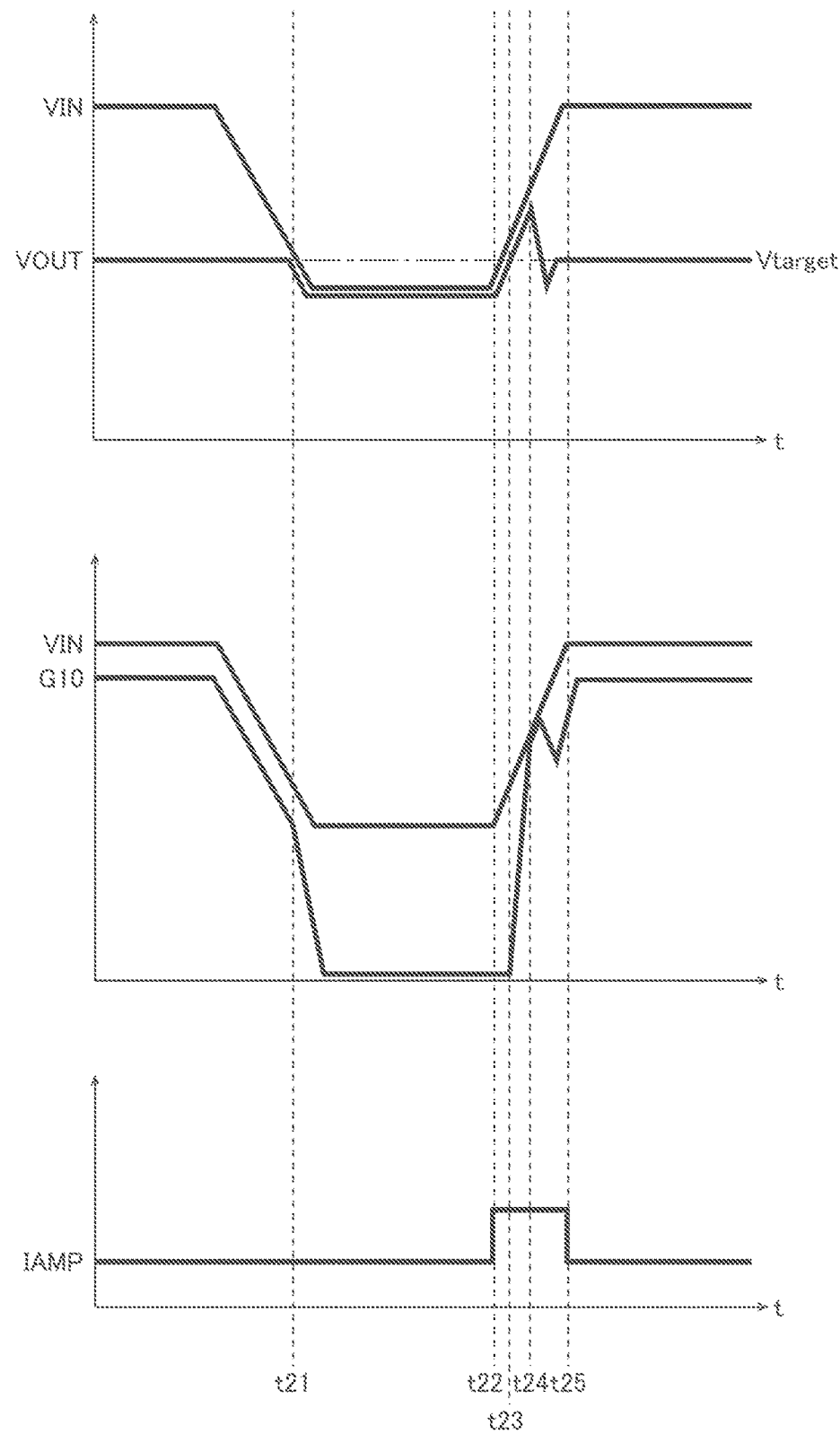
FIG. 4 is a diagram showing the input transient response characteristic in the first embodiment.

FIG. 4 is a diagram showing the input transient response characteristic in the first embodiment. Here, an upper part of the figure shows a relationship between the input voltage VIN and the output voltage VOUT, and a middle part of the figure shows a relationship between the input voltage VIN and the gate signal G10. Further, a lower part of the figure shows a behavior of the drive current IAMP.

Along with decrease of the input voltage VIN, if the input voltage VIN decreases to be below the output target value Vtarget (=the target value of the output voltage VOUT), a state is brought about where the feedback voltage VFB is constantly below the reference voltage VREF. As a result, the amplifier 30 is brought into a state where the gate signal G10 is lowered to its lowest possible level, and thus the output transistor 10 falls into the full-on state (see time t21 to time t23). That is, the amplifier 30 operates in a manner close to a comparator. The operation so far is basically not different from the above-described comparative example (see time t11 to time t13 in FIG. 2).

In a case where the input voltage VIN increases sharply from such a state to be higher than the output target value Vtarget, the amplifier 30 tries to raise the gate signal G10 and turn off the output transistor 10.

At this time, the drive current controller 60 detects a variation (an increase) of the input voltage VIN, and while the input voltage VIN is increasing, the drive current controller 60 boosts the drive current IAMP for the amplifier 30 to a value larger than its steady-state value (see time t22 to time t25). As a result, the gain of the amplifier 30 is temporarily increased, and thus it becomes possible to raise the gate signal G10 completely at low level instantaneously following the sharp variation of the input voltage VIN.

To be specific with reference to the figure, a time (time 23 to t24 in FIG. 4) that the gate signal G10 takes to rise from low level to be equal to the input voltage VIN is shorter than that (time 3 to time 14 in FIG. 2) in the previously-described comparative example, and thus it is clear that the overshoot of the output voltage VOUT is suppressed.

Disadvantage of First Embodiment

Figure 5:
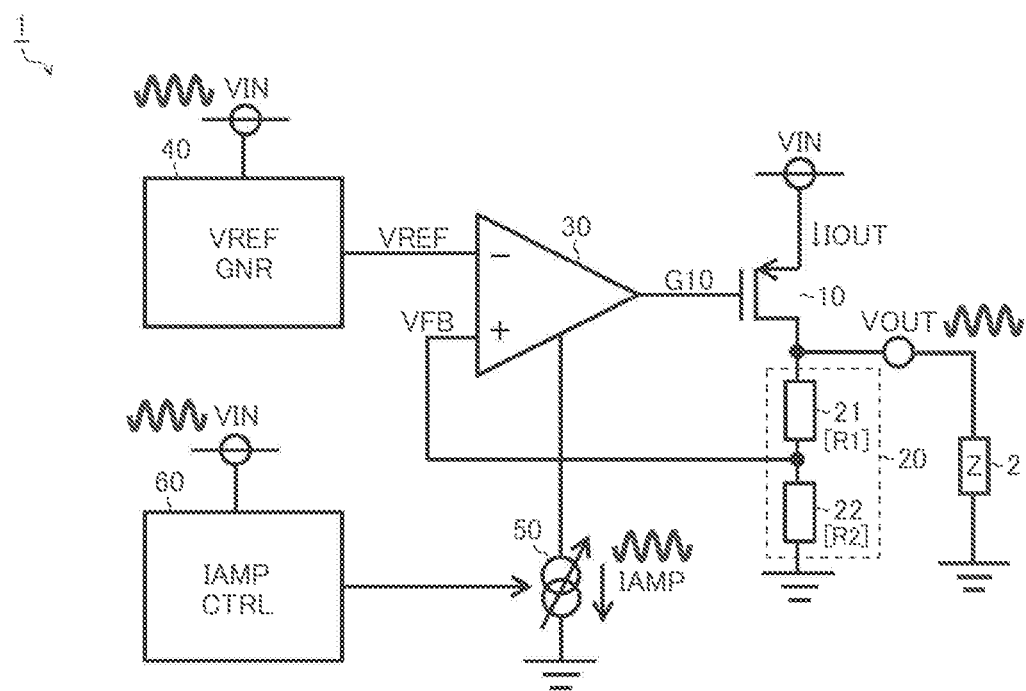
FIG. 5 is a diagram for illustrating a disadvantage of the first embodiment.

FIG. 5 is a diagram for illustrating a disadvantage of the first embodiment. As shown in the figure, the input voltage VIN can have superimposed thereon unintentional noise or ripple component (hereinafter referred to as input noise).

Figure 6:
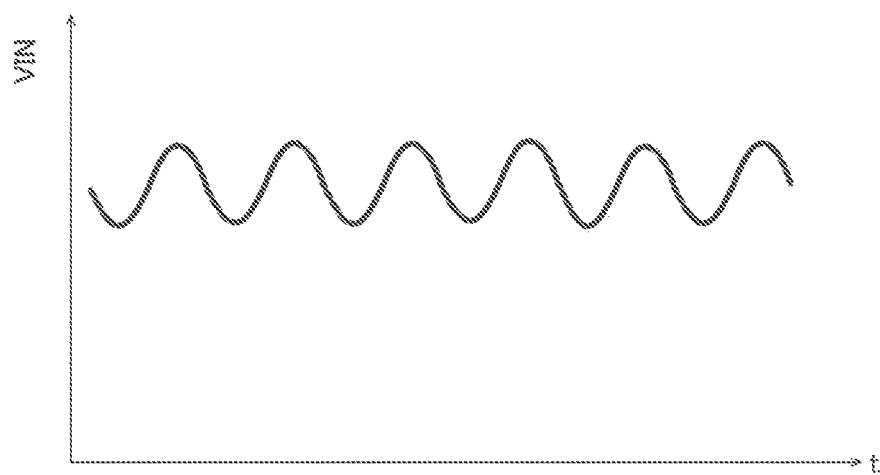
FIG. 6 is a diagram showing input/output behaviors in the first embodiment observed with superimposition of input noise.
Figure 6:
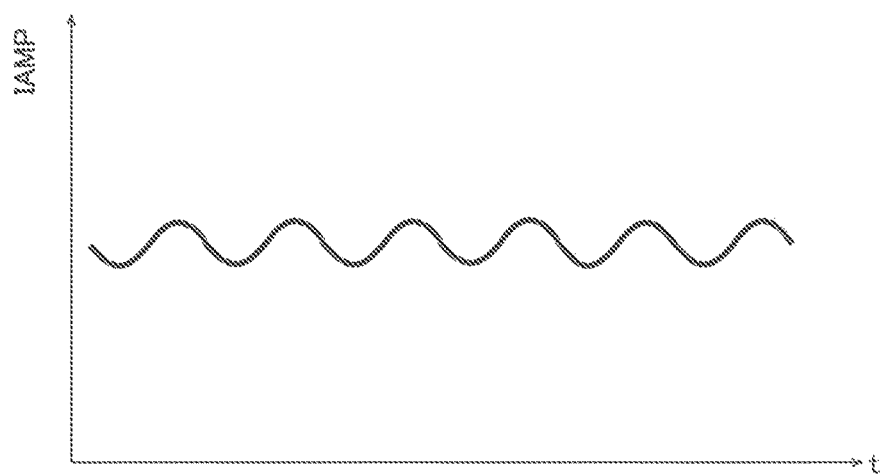
Figure 6:
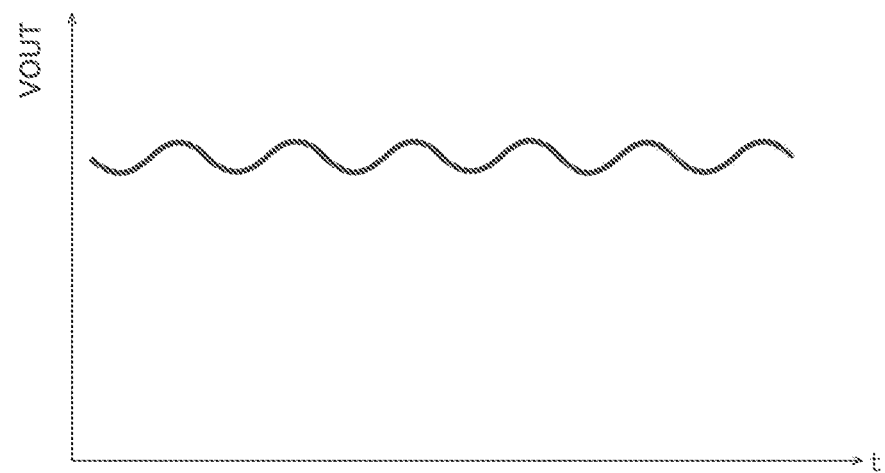

FIG. 6 is a diagram showing input/output behaviors observed with superimposition of input noise, and illustrates, in order from the top, the input voltage VIN, the drive current IAMP, and the output voltage VOUT. As in the figure, when input noise is superimposed on the input voltage VIN, it may affect, via the drive current controller 60, the drive current LAMP for the amplifier 30, and may finally cause an unintended variation of the output voltage VOUT.

In the following description, a second embodiment will be proposed capable of eliminating such inconvenience.

Second Embodiment

Figure 7:
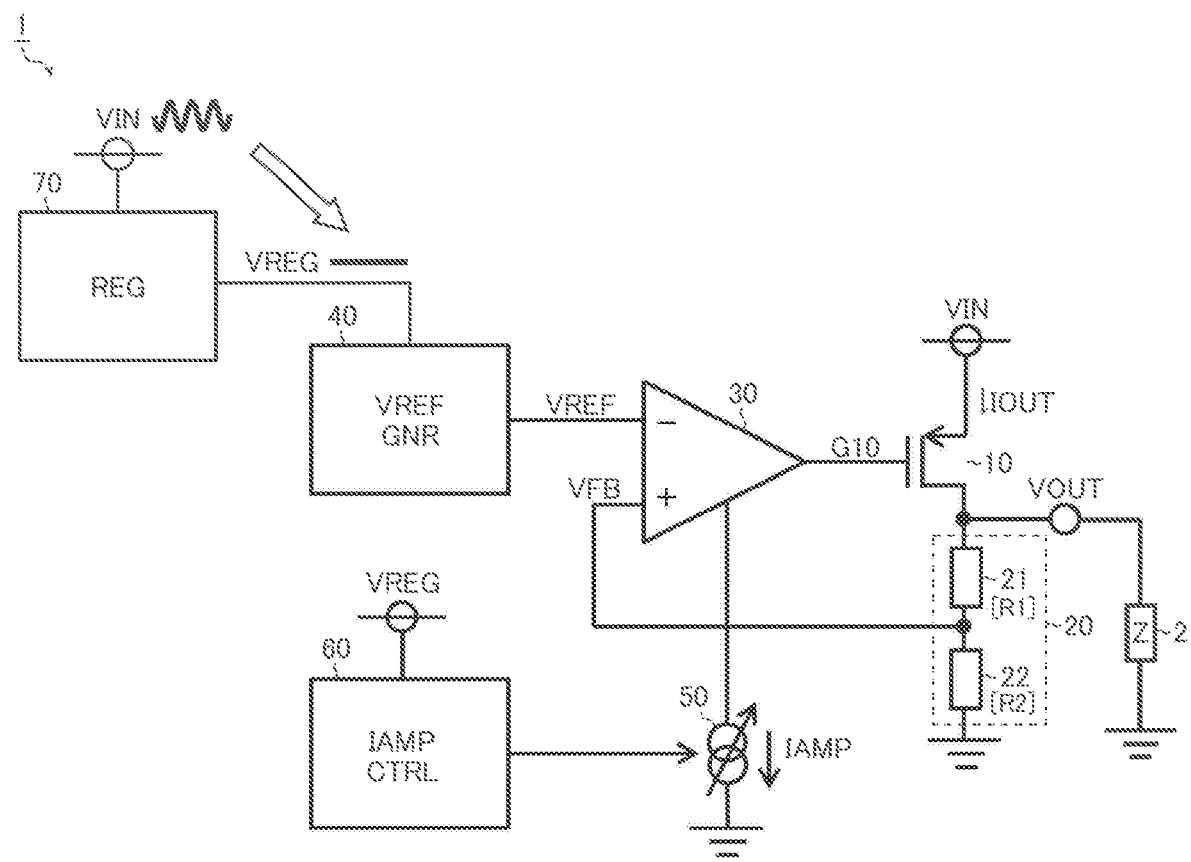
FIG. 7 is a diagram showing a second embodiment of the linear power supply.

FIG. 7 is a diagram illustrating a second embodiment of the linear power supply. A linear power supply 1 of the present embodiment is based on the above-described first embodiment (FIG. 3), and further includes an internal power supply 70 in addition to the above-described components 10 to 60.

The internal power supply 70 steps down the input voltage VIN to generate a predetermined internal power supply voltage VREG, which is fed to various portions of the linear power supply 1. Accordingly, as long as the input voltage VIN is maintained at a voltage value higher than an output target value Vtarget2 of the internal power supply voltage VREG, even if the input voltage VIN has input noise superimposed thereon, it does not affect the internal power supply voltage VREG, and the internal power supply voltage VREG is maintained at a constant value.

Here, along with the additional provision of the internal power supply 70, the configuration is modified such that the reference voltage generator 40 generates the reference voltage VREF not directly from the input voltage VIN, but from the internal power supply voltage VREG.

Further, along with the additional provision of the internal power supply 70, the configuration is also modified such that the drive current controller 60 detects not a variation of the input voltage VIN, but a variation of the internal power supply voltage VREG.

Input Transient Response Characteristic (Second Embodiment)

Figure 8:
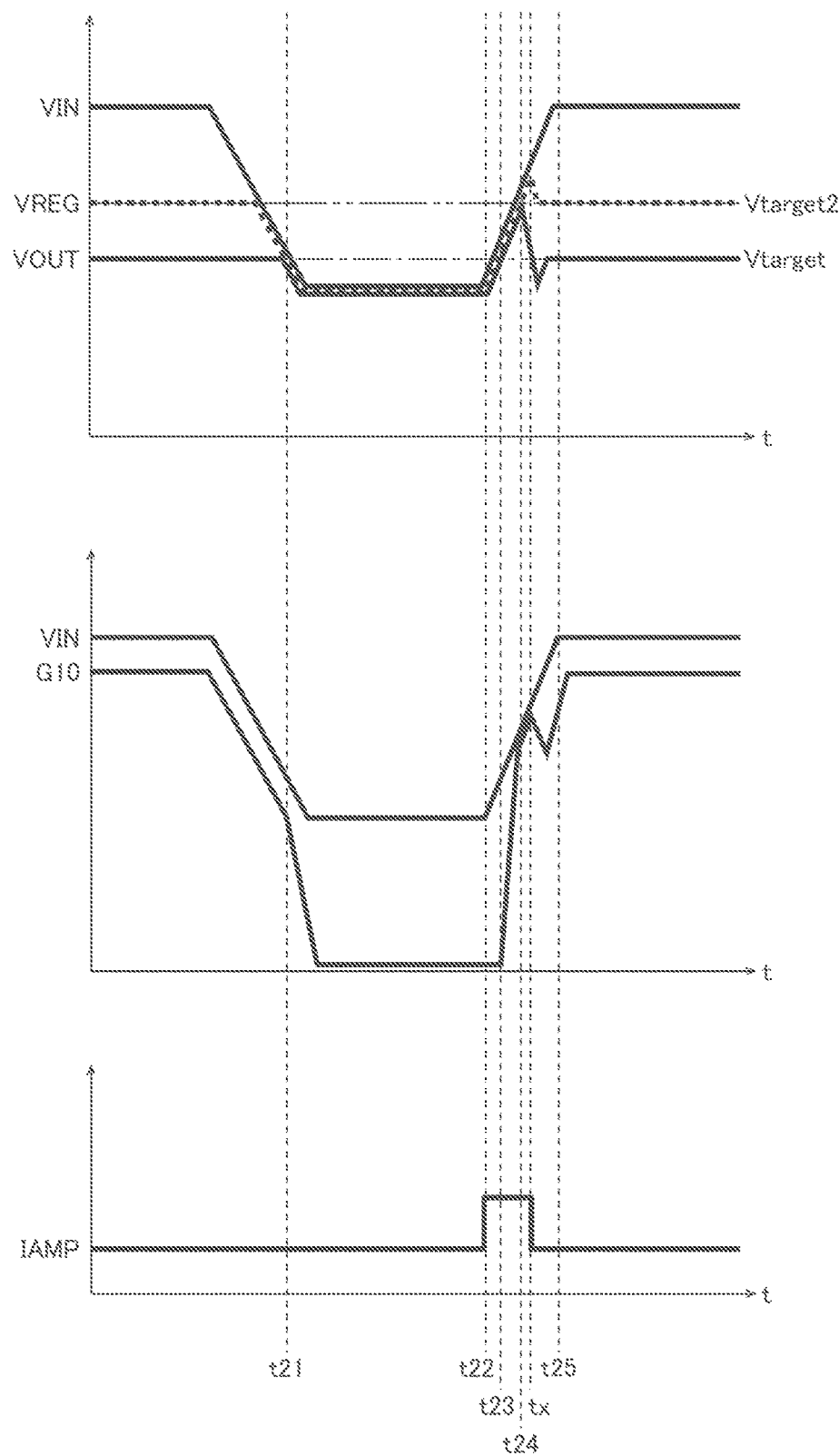
FIG. 8 is a diagram showing an input transient response characteristic in the second embodiment.

FIG. 8 is a diagram showing an input transient response characteristic in the second embodiment. Here, an upper part of the figure shows a relationship between the input voltage VIN, the internal power supply voltage VREG, and the output voltage VOUT. A middle part of the figure shows a relationship between the input voltage VIN and the gate signal G10, and a lower part of the figure shows a behavior of the drive current IAMP.

The input transient response characteristic in the second embodiment is basically similar to that in the above-described first embodiment (FIG. 4). Specifically, along with decrease of the input voltage VIN, if the input voltage VIN decreases to be below the output target value Vtarget (=the target value of the output voltage VOUT), the amplifier 30 operates in a manner close to a comparator, and, when the input voltage VIN sharply increases from this state to a value higher than the output target value Vtarget, the amplifier 30 tries to raise the gate signal G10 and turn off the output transistor 10.

At this time, the drive current controller 60 detects a variation (an increase) of the internal power supply voltage VREG, and while the internal power supply voltage VREG is increasing, the drive current controller 60 boosts the drive current IAMP for the amplifier 30 to a value larger than the steady-state value (see time t22 to time tx). As a result, the gain of the amplifier 30 is temporarily increased, and thus it becomes possible to raise the gate signal GM completely at low level instantly following the sharp variation of the input voltage VIN, and thus to suppress an overshoot.

Here, although it depends on characteristics of the internal power supply 70, the increasing time (=time t22 to time tx) of the internal power supply voltage VREG is generally shorter than the that (=time t22 to time t25) of the input voltage VIN. Thus, in the second embodiment, it can take less time to boost the drive current IAMP than in the first embodiment discussed above.

However, with the linear power supply 1 of the present embodiment, even when the input voltage VIN has input noise superimposed thereon, the input transient response characteristic can be improved without inviting deterioration in characteristics of the output voltage. A detailed description will be given below with reference to the relevant figures.

Figure 9:
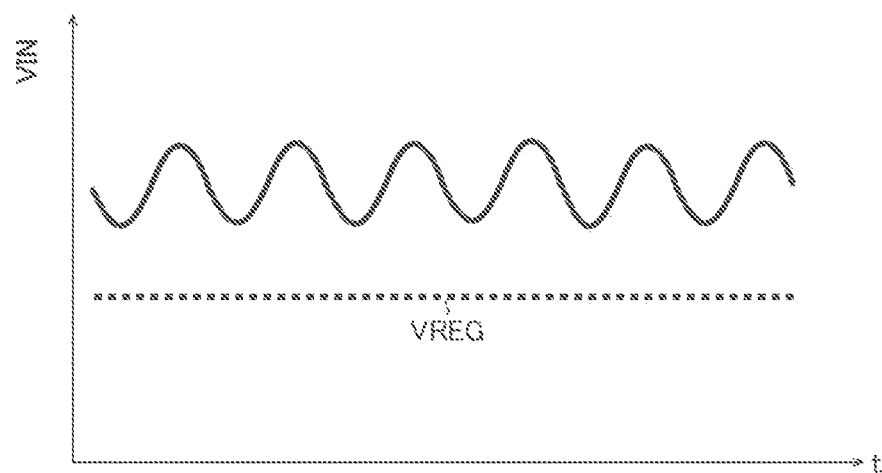
FIG. 9 is a diagram showing input/output behaviors in the second embodiment observed with superimposition of input noise.
Figure 9:
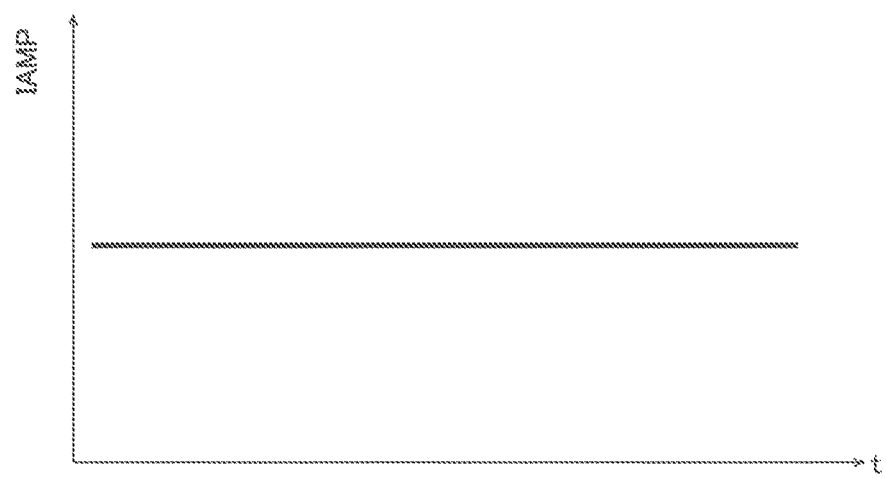
Figure 9:
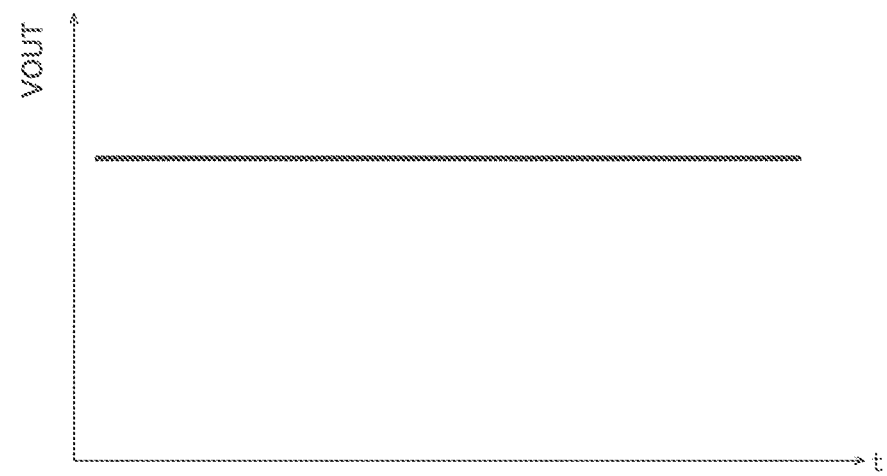

FIG. 9 is a diagram showing input/output behaviors observed with superimposition of input noises, and illustrates, in order from the top, the input voltage VIN and the internal power supply voltage VREG (a broken line), the drive current IAMP, and the output voltage VOUT.

As already mentioned above, when the input voltage VIN is maintained at a voltage value that is higher than the target value of the internal power supply voltage VREG, even if the input voltage VIN has input noise superimposed thereon, it does not affect the internal power supply voltage VREG, and the internal power supply voltage VREG is maintained at a constant value. Accordingly, the input noise does not affect the drive current IAMP for the amplifier 30 via the drive current controller 60, and thus there is no risk of an unintentional variation of the output voltage VOUT, either. This principle of operation makes it possible to achieve an improved input transient response characteristic without inviting deterioration in characteristics of the output voltage, even with input noise superimposed on the input voltage VIN.

Third Embodiment

Figure 10:
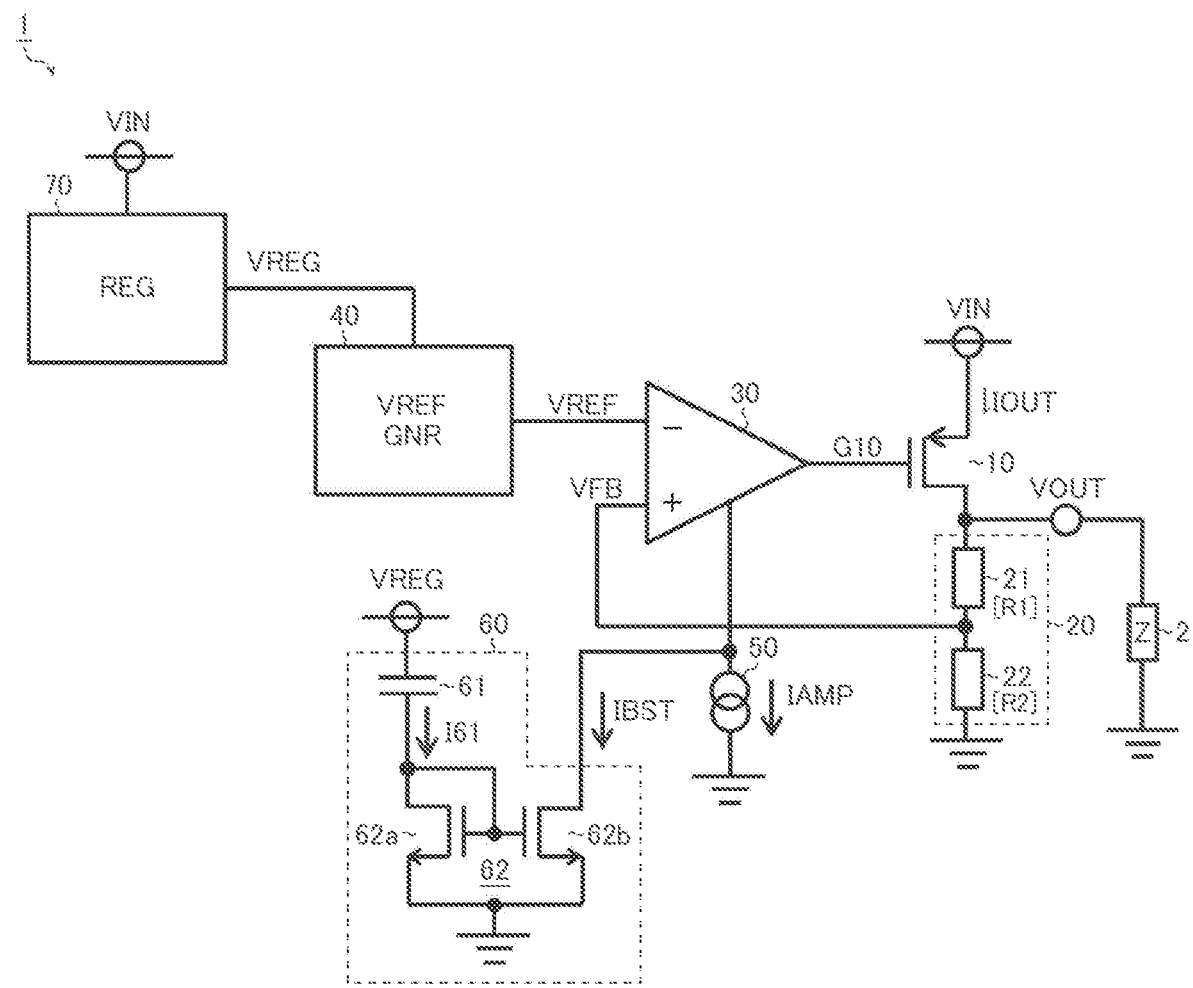
FIG. 10 is a diagram showing a third embodiment of the linear power supply.

FIG. 10 is a diagram showing a third embodiment of the linear power supply. A linear power supply 1 of the present embodiment is based on the above-described second embodiment (FIG. 7), and the drive current controller 60 specifically includes a capacitor 61 and a boost current generator 62 as its components. The boost current generator 62 includes NMOSFETs 62a and 62b.

A first terminal of the capacitor 61 is connected to an application terminal of the internal power supply voltage VREG. A second terminal of the capacitor 61 is connected to a drain of the NMOSFET 62a. Gates of the NMOSFETs 62a and 62b are both connected to the drain of the NMOSFET 62a. Sources of the NMOSFETs 62a and 62b are both connected to the ground terminal. Here, a drain of the NMOSFET 62b is connected, as an output terminal of a boost current IBST, to a connection node between the amplifier 30 and the drive current generator 50.

In the drive current controller 60 having the above configuration, the capacitor 61 functions as a coupling capacitor which cuts off a direct-current (DC) component of the internal power supply voltage VREG and passes only an alternating-current (AC) component (=a variable component) of the internal power supply voltage VREG. More specifically, in the capacitor 61, only while the internal power supply voltage VREG is increasing, a current I61 flows in a direction from the application terminal of the internal power supply voltage VREG, via the NMOSFET 62a, to the ground terminal.

The boost current generator 62 generates the boost current IBST in accordance with the AC component of the internal power supply voltage VREG, and adds the boost current IBST to the drive current IAMP for the amplifier 30. In particular, the boost current generator 62 includes a current mirror (=the NMOSFETs 62a and 62b) which generates the boost current IBST by mirroring the current I61 flowing through the capacitor 61.

Accordingly, while the internal power supply voltage VREG is increasing, a sum current (=IAMP+IBST), obtained by adding the drive current IAMP and the boost current IBST, flows through the amplifier 30, and thereby a gain of the amplifier 30 can be temporarily increased.

Fourth Embodiment

FIG. 1I is a diagram showing a fourth embodiment of the linear power supply. A linear power supply 1 of the present embodiment is based on the above-described third embodiment (FIG. 10), and includes, as components of the boost current generator 62, an NMOSFET 62c and resistors 62d and 62e instead of the NMOSFETs 62a and 62b described above.

The first terminal of the capacitor 61 is connected to the application terminal of the internal power supply voltage VREG. The second terminal of the capacitor 61 is connected to a gate of the NMOSFET 62c and to a first terminal of the resistor 62d. A source of the NMOSFET 62c and a second terminal of the resistor 62d are both connected to the ground terminal. A drain of the NMOSFET 62c is connected to a first terminal of the resistor 62e. A second terminal of the resistor 62e is connected, as the output terminal of the boost current IBST, to the connection node between the amplifier 30 and the drive current generator 50.

In the drive current controller 60 having the above configuration, the resistor 62d functions as a current/voltage conversion element which converts the current I61 flowing through the capacitor 61 into a differential voltage V61. The NMOSFET 62c functions as a transistor that generates the boost current IBST in accordance with the differential voltage V61. More specifically, the NMOSFET 62c makes the boost current IBST larger as the differential voltage V61 is higher, and conversely, makes the boost current IBST smaller as the differential voltage V61 is lower. Thus, the boost current generator 62 has an arbitrary circuit configuration.

Fifth Embodiment

Figure 12:
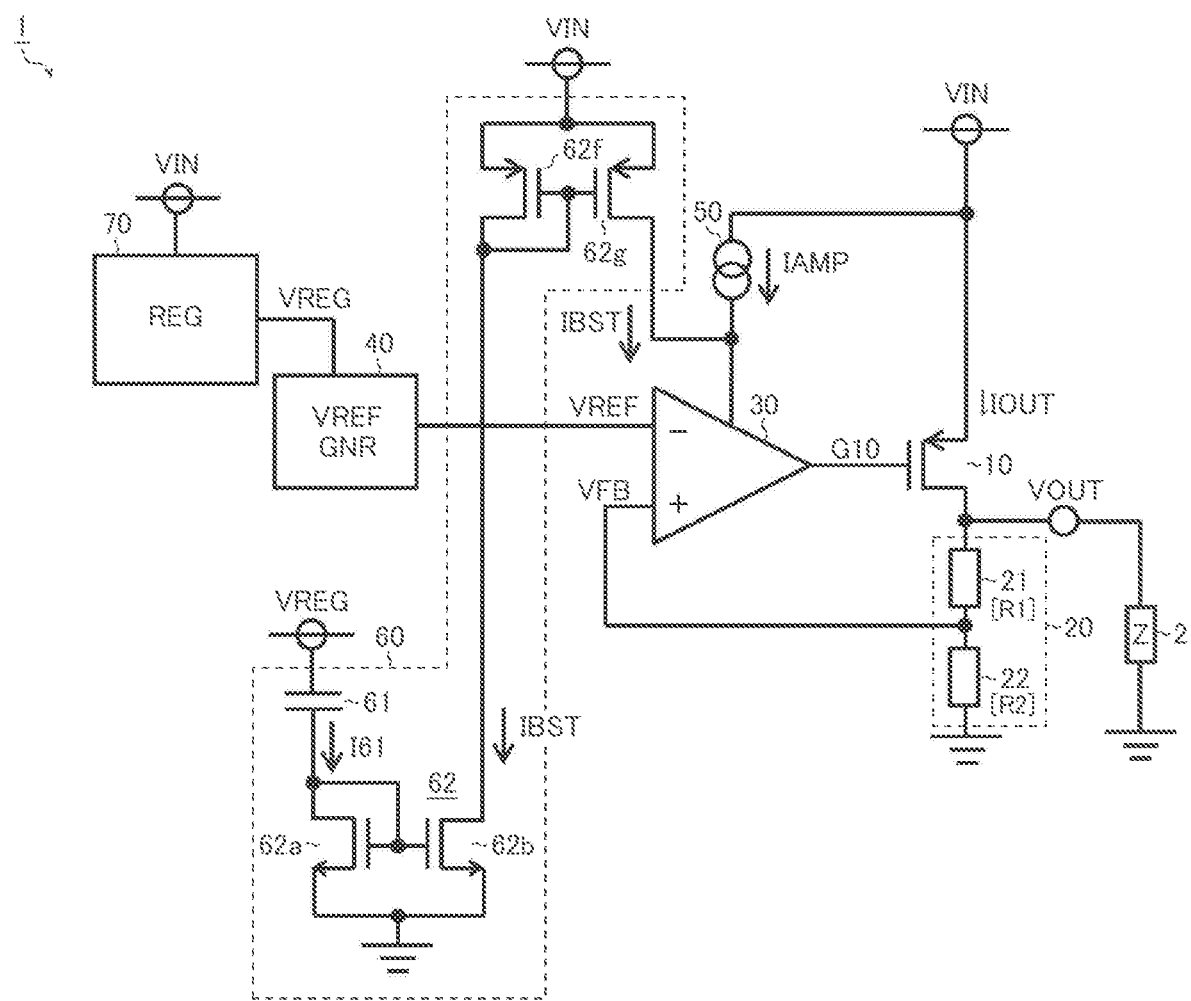
FIG. 12 is a diagram showing a fifth embodiment of the linear power supply.

FIG. 12 is a diagram showing a fifth embodiment of the linear power supply. A linear power supply 1 of the present embodiment is based on the above-described third embodiment (FIG. 10), and the drive current generator 50 is modified into a source current supply connected between the input terminal of the input voltage VIN and the amplifier 30, and the linear power supply 1 further includes PMOSFETs 62f and 62g as components of the drive current controller 60 (in particular, the boost current generator 62).

Sources of the PMOSFET 62f and 62g are both connected to the input terminal of the input voltage VIN. Gates of the PMOSFET 62f and 62g are both connected to a drain of the PMOSFET 62f. The drain of the PMOSFET 62f is connected to the drain of the NMOSFET 62b. On the other hand, a drain of the PMOSFET 62g is, as the output terminal of the boost current BST, connected to the connection node between the amplifier 30 and the drive current generator 50.

Thus, in the case where the drive current generator 50 is a source current supply, by using a current mirror composed of the PMOSFET 62f and 62g to further mirror the boost current IBST flowing to the drain of the NMOSFET 62b, the boost current IBST can be made to flow from the input terminal of the input voltage VIN toward the amplifier 30, together with the drive current IAMP.

Figure 11:
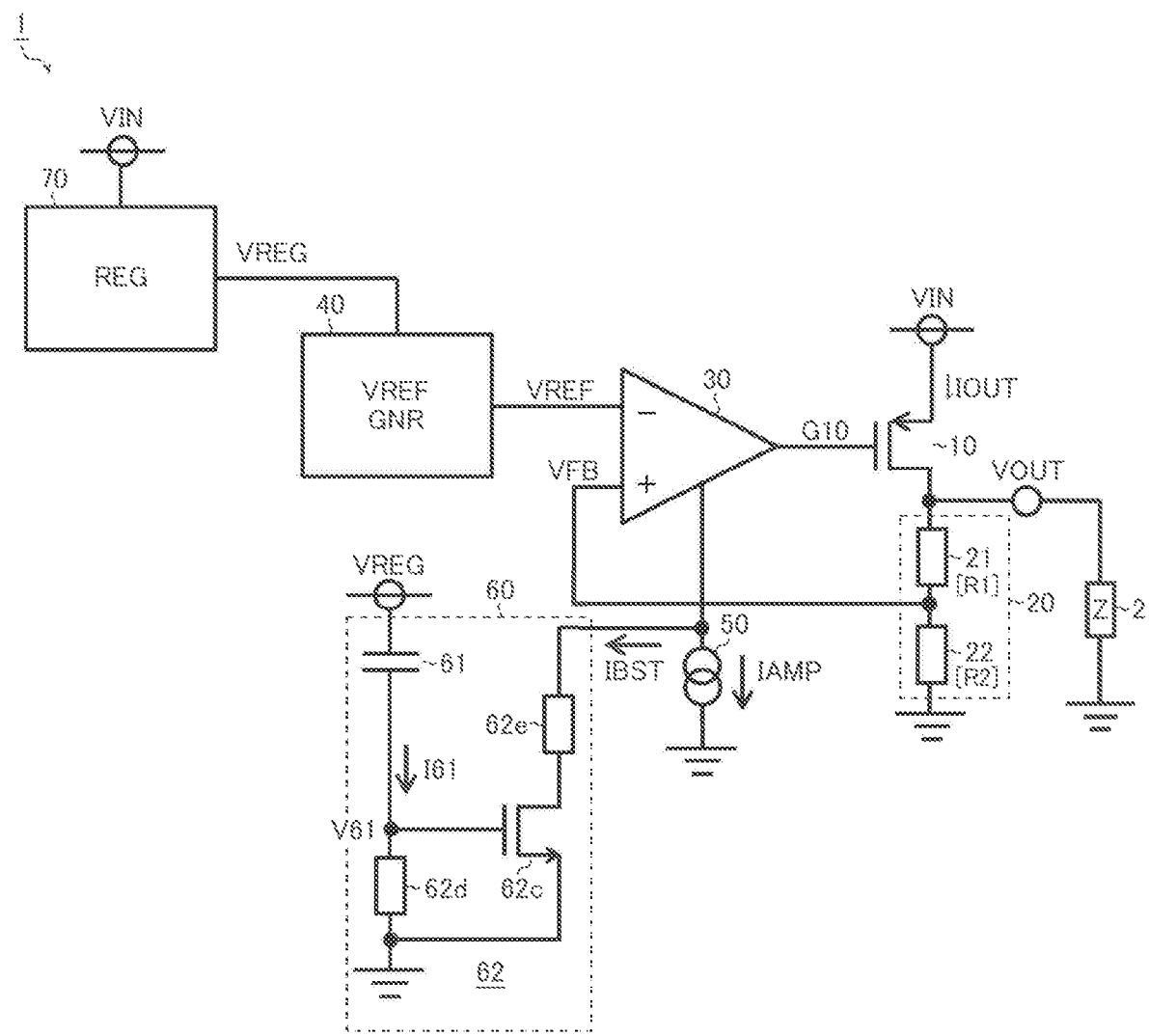
FIG. 11 is a diagram showing a fourth embodiment of the linear power supply.

It should be noted that although the example described here is based on the above-described third embodiment (FIG. 10), it may instead be based on the above-described fourth embodiment (FIG. 11), modifying the drive current generator 50 into a source current supply, and further including the PMOSFET 62f and 62g as components of the drive current controller 60 (in particular, the boost current generator 62). In that case, the drain of the PMOSFET 62f is connected to the second terminal of the resistor 62e.

<Application to Vehicle>

Figure 13:
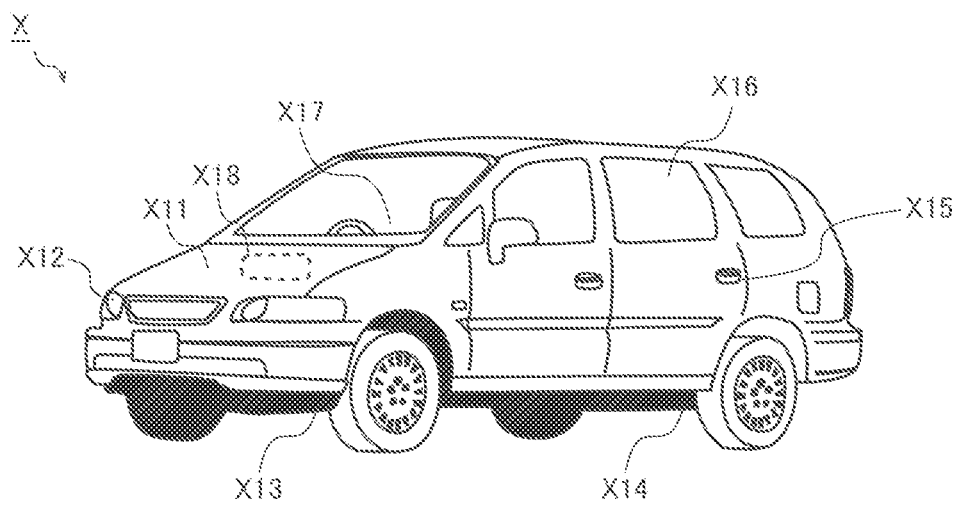
FIG. 13 is an external view of a vehicle.

FIG. 13 is an external view of a vehicle X. The vehicle X of the present configuration example is equipped with various electronic devices X11 to X18 which each operate with a power supply voltage supplied from an unillustrated battery. Mounting positions of the electronic devices X11 to X18 shown in the figure may be different from their actual positions for the convenience of illustration.

The electronic device X11 is an engine control unit which performs engine-related control (injection control, electronic throttle control, idling control, oxygen sensor heater control, automated cruise control, etc.).

The electronic device X12 is a lamp control unit which performs on/off control of a high intensity discharge lamp (HID), a daytime running lamp (DRL), and the like.

The electronic device X13 is a transmission control unit which performs transmission-related control.

The electronic device X14 is a motion control unit that performs control related to motion of the vehicle X (anti-lock brake system (ABS) control, electric power steering (EPS) control, electronic suspension control, etc.).

The electronic device X15 is a security control unit which performs drive control of a door lock, an anti-theft alarm, and the like.

The electronic device X16 is an electronic device such as a wiper, an electric door mirror, a power window, a damper (a shock absorber), an electric sunroof, an electric seat, or the like, incorporated in the vehicle X as standard equipment or a factory option at the shipping stage.

The electronic device X17 is an electronic device arbitrarily mounted in the vehicle X, such as an in-vehicle audio/visual (AV) apparatus, a car navigation system, an electronic toll collection system (ETC), or the like.

The electronic device X18 is an electronic device including a high voltage motor, such as an in-vehicle blower, an oil pump, a water pump, a battery cooling fan, or the like.

Note that the linear power supplies 1 described above can be incorporated in any of the electronic devices X11 to X18.

Overview

To follow is an overview of the various embodiments described herein.

For example, according to one aspect of what is disclosed herein, a linear power supply includes an output transistor connected between an input terminal of an input voltage and an output terminal of an output voltage, an internal power supply configured to step down the input voltage to generate a predetermined internal power supply voltage, a reference voltage generator configured to generate a predetermined reference voltage from the internal power supply voltage, an amplifier configured to generate a drive signal for the output transistor such that a feedback voltage in accordance with the output voltage is equal to the reference voltage, a drive current generator configured to generate a drive current for the amplifier, and a drive current controller configured to detect a variation of the internal power supply voltage to variably control the drive current (a first configuration).

In the linear power supply having the first configuration, the drive current controller may be configured to boost the drive current while the internal power supply voltage is increasing (a second configuration).

In the linear power supply having the second configuration, the drive current controller may include a capacitor configured to pass only an AC component of the internal power supply voltage, and a boost current generator configured to add a boost current in accordance with the AC component to the drive current (a third configuration).

In the linear power supply having the third configuration, the boost current generator may include a current mirror configured to mirror a current flowing through the capacitor to generate the boost current (a fourth configuration).

In the linear power supply having the third configuration, the boost current generator may include a resistor configured to convert a current flowing through the capacitor into a differential voltage, and a transistor configured to generate the boost current in accordance with the differential voltage (a fifth configuration).

In the linear power supply having any one of the first to fifth configurations, the drive current generator may be connected between the amplifier and the ground terminal (a sixth configuration).

In the linear power supply having any one of the first to fifth configurations, the drive current generator may be connected between the input terminal of the input voltage and the amplifier (a seventh configuration).

The linear power supply having any one of the first to seventh configurations may further include a voltage divider configured to divide the output voltage to generate the feedback voltage (an eighth configuration).

According to another aspect of what is disclosed herein, an electronic device includes the linear power supply having any one of the first to eighth configurations, and a load configured to operate with power supplied from the linear power supply (a ninth configuration).

According to another aspect of what is disclosed herein, a vehicle includes the electronic device having the ninth configuration and a battery which supplies power to the electronic device (a tenth configuration).

Other Modifications

In addition to the above embodiments, it is possible to add various modifications to the various technical features disclosed herein without departing the spirit of the technological creation. In other words, it should be understood that the above embodiments are examples in all respects and are not limiting; the technological scope of the present invention is not indicated by the above description of the embodiments but by the claims; and all modifications within the scope of the claims and the meaning equivalent to the claims are covered.

INDUSTRIAL APPLICABILITY

The invention disclosed herein is usable in vehicle-related devices, ship-related devices, office devices, portable devices, smartphones, etc.

What is claimed is:

1. A linear power supply comprising:
   an output transistor configured to be connected between an input terminal of an input voltage and an output terminal of an output voltage;
   an internal power supply configured to step down the input voltage to generate a predetermined internal power supply voltage;
   a reference voltage generator configured to generate a predetermined reference voltage from the internal power supply voltage;
   an amplifier configured to generate a drive signal for the output transistor such that a feedback voltage in accordance with the output voltage is equal to the reference voltage;
   a drive current generator configured to generate a drive current for the amplifier; and
   a drive current controller configured to detect a variation of the internal power supply voltage to variably control the drive current,
   wherein the drive current controller boosts the drive current while the internal power supply voltage is increasing, and
   wherein the drive current controller includes:
      a capacitor configured to pass only an alternating-current component of the internal power supply voltage, and
      a boost current generator configured to add, to the drive current, a boost current in accordance with the alternating-current component.

2. The linear power supply according to claim 1, wherein the boost current generator includes a current mirror configured to mirror a current flowing through the capacitor to generate the boost current.

3. The linear power supply according to claim 1, wherein the boost current generator includes
   a resistor configured to convert a current flowing through the capacitor into a differential voltage, and
   a transistor configured to generate the boost current in accordance with the differential voltage.

4. The linear power supply according to claim 1, wherein the drive current generator is configured to be connected between the amplifier and a ground terminal.

5. The linear power supply according to claim 1, wherein the drive current generator is configured to be connected between the input terminal of the input voltage and the amplifier.

6. The linear power supply according to claim 1, further comprising:
- a voltage divider configured to divide the output voltage to generate the feedback voltage.

7. An electronic device comprising:
- the linear power supply according to claim 1; and
- a load configured to operate with power supplied from the linear power supply.

8. A vehicle comprising:
- the electronic device according to claim 7; and
- a battery which supplies power to the electronic device.

* * * * *